Dec. 24, 1940.  C. C. WEBB  2,225,672
APPARATUS FOR MOLDING PLASTIC ARTICLES
Filed Aug. 8, 1936  5 Sheets-Sheet 3

INVENTOR
Charles C. Webb
by Stebbins, Blenko & Parmelee
his attorneys

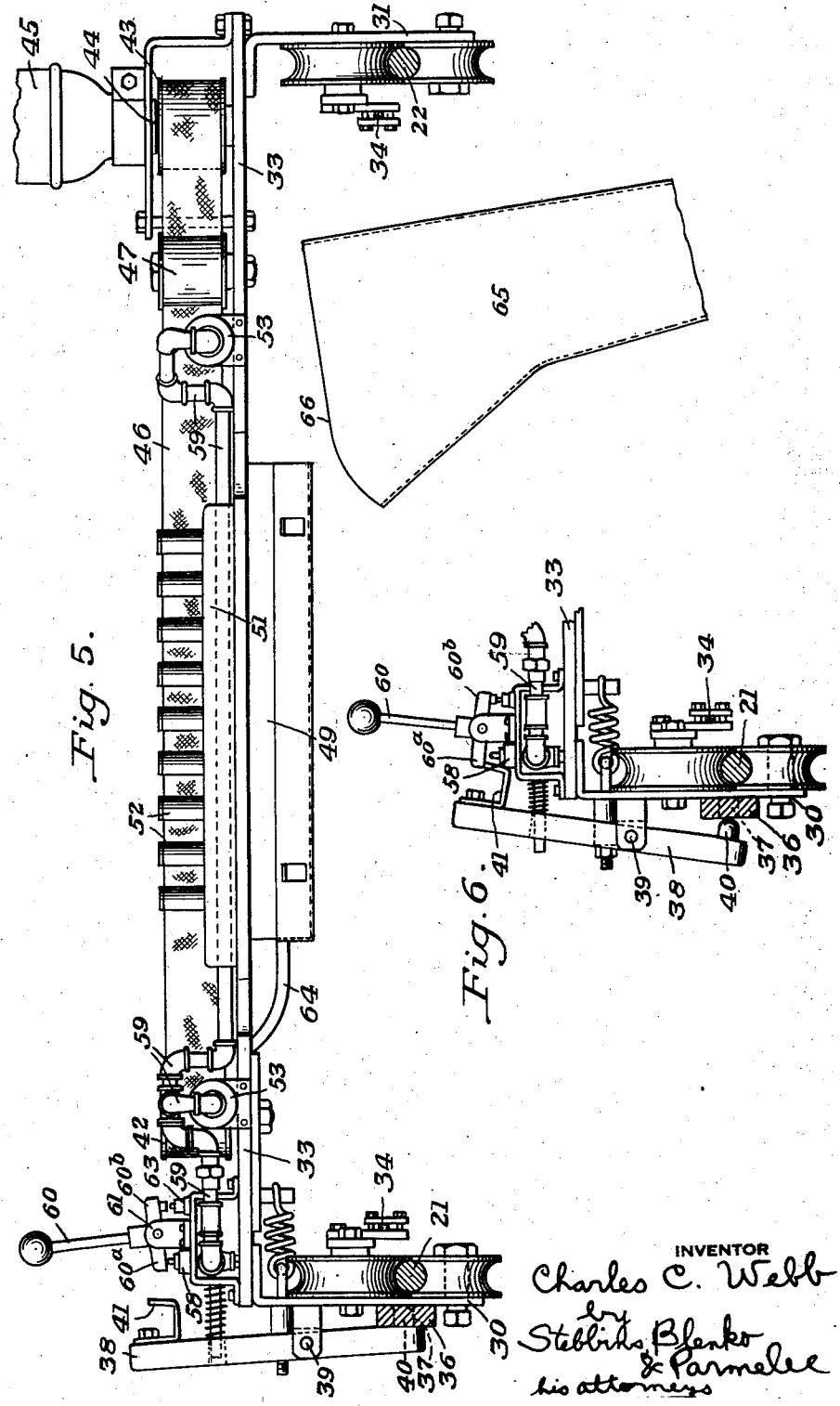

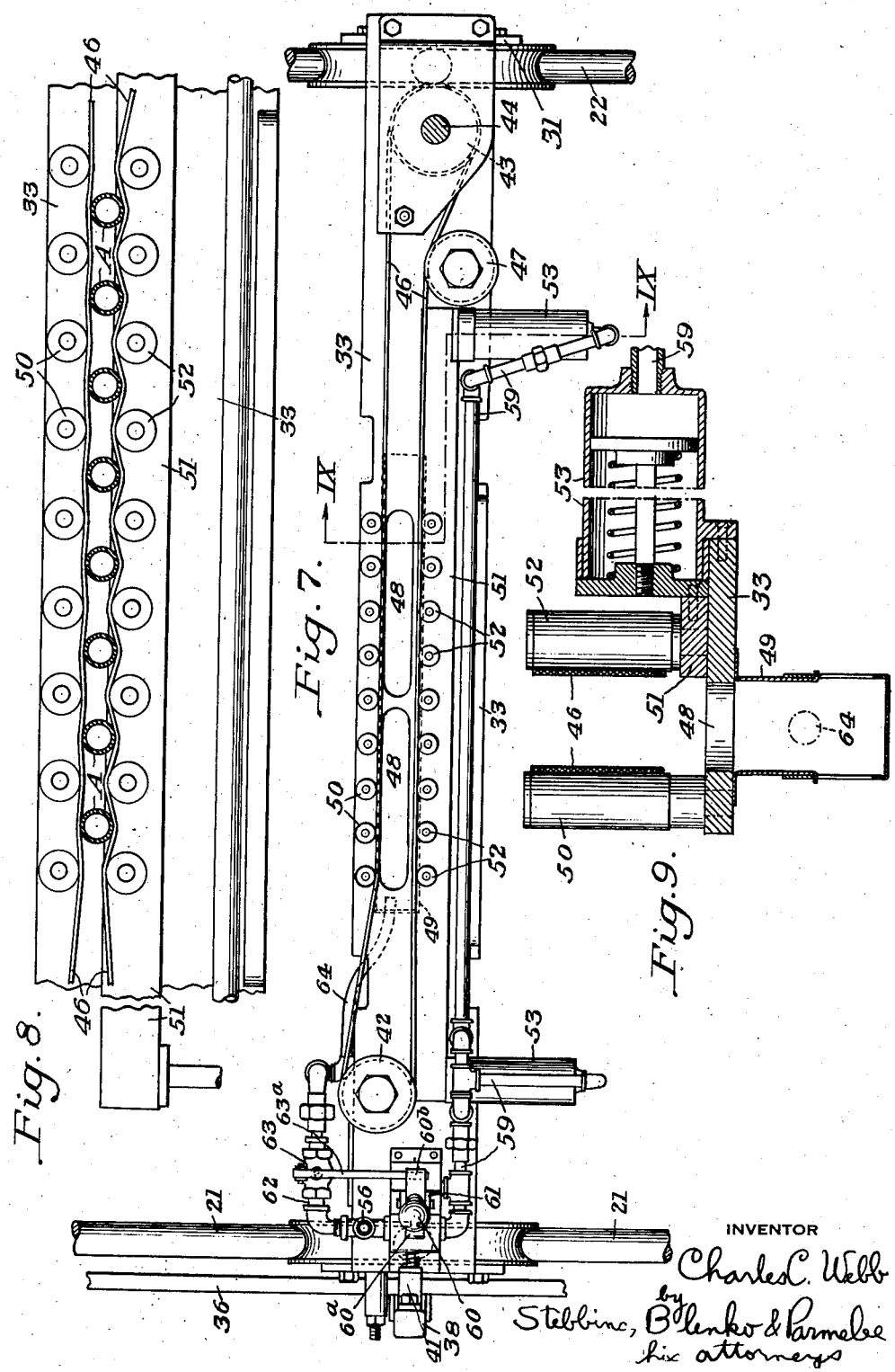

Patented Dec. 24, 1940

2,225,672

UNITED STATES PATENT OFFICE 2,225,672

APPARATUS FOR MOLDING PLASTIC ARTICLES

Charles C. Webb, Wheeling, W. Va., assignor to Wheeling Stamping Company, Wheeling, W. Va., a corporation of West Virginia Application August 8, 1936, Serial No. 94,977

14 Claims. (Cl. 18—16)

This invention relates to the molding of small articles from plastic compositions, such as synthetic resins, and is for an apparatus for removing formed articles from the molds after the articles have been formed.

In the molding of small articles from plastic compositions, the formed article frequently has a threaded surface which at the end of the molding process engages that portion of the mold which forms the thread, and it is necessary in stripping the formed article from the mold to rotate it in a direction which will unscrew it from the forming die. Some articles are of a character which can be formed on a mold block which can be easily removed from the press after the molding operation has been completed and the article stripped from the mold block after the press has been charged with another set of molds and while the press is operating to form articles on said other set of molds. Some articles, however, are of a character which cannot be formed on a readily removable forming mold of this character. Such articles have to be stripped from the press while the press remains open and before another charge can be put in the press.

The present invention provides a stripping apparatus particularly adapted to the removal of articles of the character last described which have to be stripped from the molds or dies while the molds or dies remain in the press. Moreover, the present invention provides an apparatus by means of which a large number of formed articles can be simultaneously stripped from a multiple mold. The invention further provides a stripping apparatus which will operate on the articles without injury to the surface thereof and with a minimum of breakage.

The invention provides a mechanism which is particularly applicable to the removal of elongated articles, such as vials or bottles formed of resinous material, from a forming apparatus.

My invention may be readily understood by reference to the accompanying drawings which illustrate one embodiment of my invention, and in which Figure 1 shows a front elevation of a forming press having an apparatus embodying my invention applied thereto;

Figure 5 is a side elevation of the stripping apparatus, the view showing the apparatus apart from the press;

Figure 6 is a fragmentary view showing one end of the apparatus illustrated in Figure 5, but with the positioning lever in a different position;

Figure 7 is a top plan view of the mechanism shown in Figure 5 showing the stripper in open position;

Figure 8 is a fragmentary view of a portion of the apparatus shown in Figure 7, showing the stripper in closed position; and Figure 9 is a transverse section in the plane of the staggered line IX—IX of Figure 7, and on a somewhat larger scale.

Figure 1:
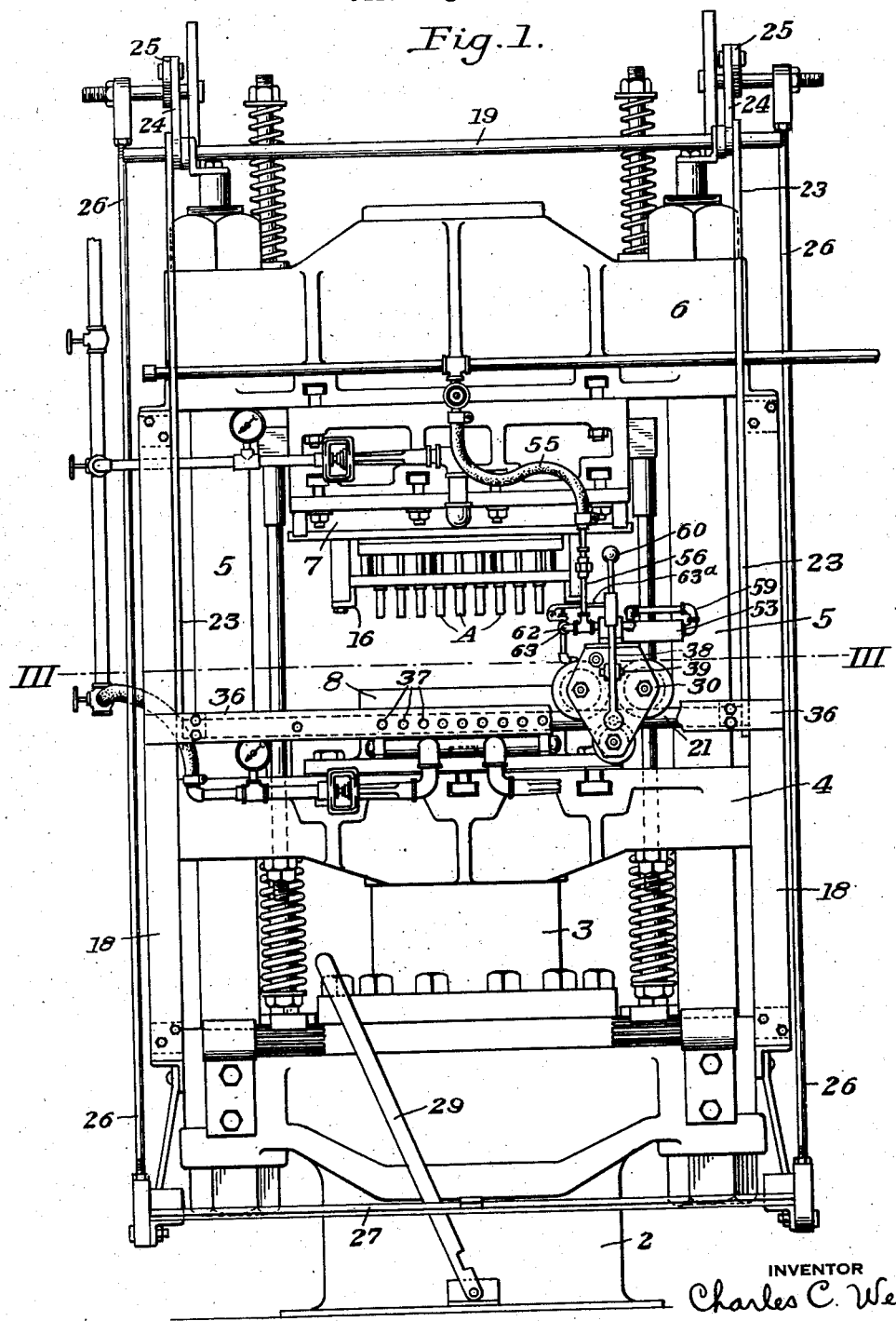
Figure 2:
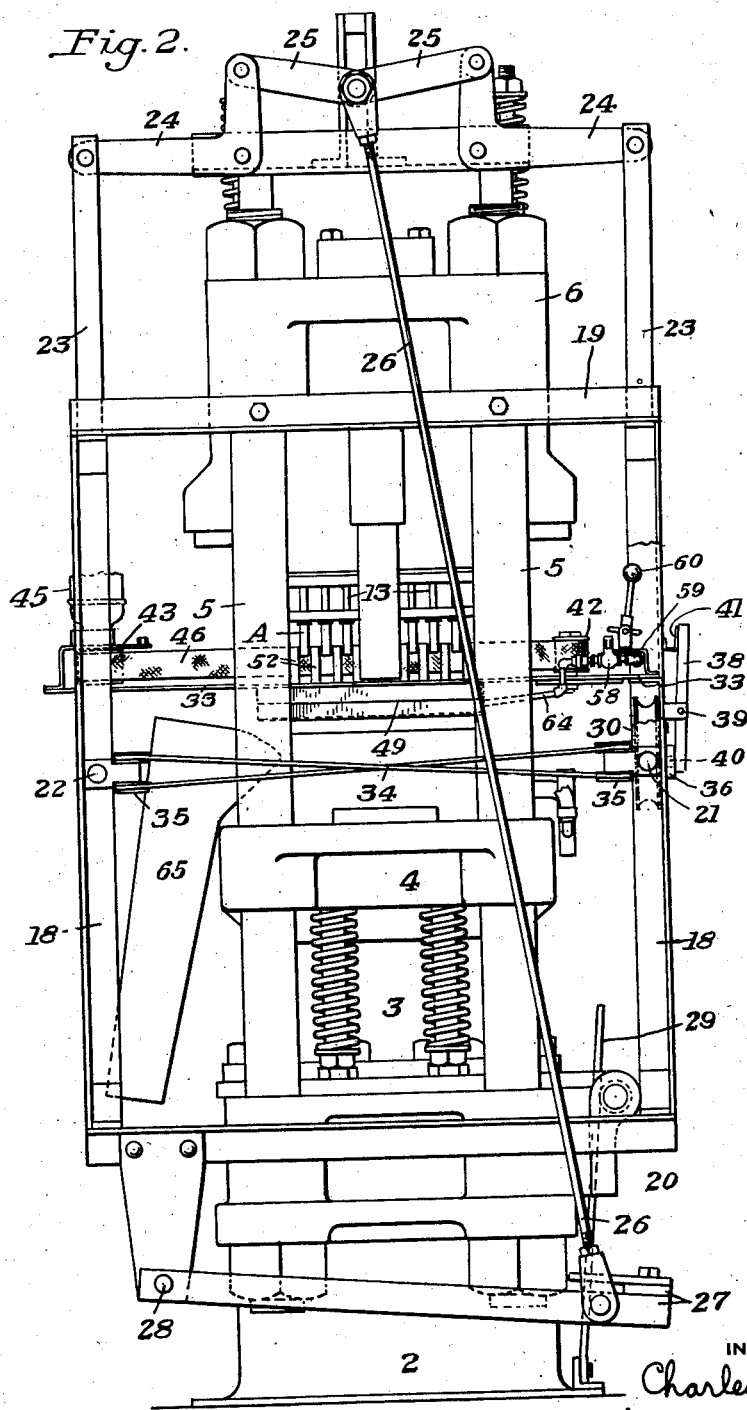
Figure 2 is a side elevation of the apparatus shown in Figure 1.

Referring to the drawings, 2 designates the base of a hydraulic press of the character commonly used for plastic molding. It is provided with a ram 3 having a movable platen 4, this platen being guided on upright posts 5. At the top of the posts 5 is a stationary head or cross piece 6. Carried on the under side of the cross piece 6 between the posts 5 is a mold assembly 7. The mold assembly 7 is intended for cooperation with a properly formed matrix 8 carried on the platen 4.

Figure 4:
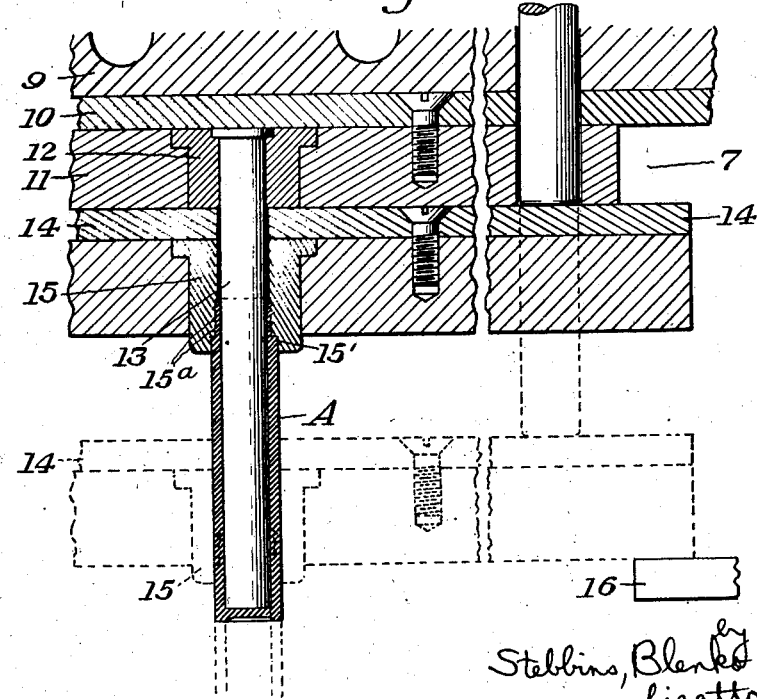
Figure 4 is an enlarged detail view through a portion of the forming die showing one form of article which the present invention is adapted to remove, this figure of the drawing being a fragmentary view showing only a single unit of the multiple mold.

For the purpose of the present invention, the mold will be described as a mold for forming small tubular articles having threaded upper ends, such as vials. One such article is shown in Figure 4 and is designated A. The upper part 7 of the mold comprises a base member 9 on which is carried a base plate 10 having a plate 11 secured thereto. The plate 11 is provided with a series of bushings 12 for supporting plungers 13 adapted to mold the interior of the vials. There is provided a second plate member 14 having a series of bushings 15 therein, each bushing 15 having an opening through which a corresponding plunger 13 operates. The lower portion of the bore in each member 15 is internally threaded as indicated at 15', to form the thread on the upper part of the vial or similar article being formed, and is also provided with an enlargement 15a which shapes the shoulder and upper portion of the vial immediately below the threaded neck. The remaining portion of the vial A is shaped in the cavities of the lower mold 8. During the pressing operation, the plate 11 is forced down against the top of the plate 14, the parts being in the relative position shown in full lines in Figure 4. When the pressure on the press is released and the press opens, the plate 14 drops away from the plate 11 to the dotted line position shown in Figure 4, which is the full line position of Figure 1, in which position the plates 11 and 14 are separated a sufficient distance for the plungers 13 to be substantially withdrawn from the interior of the molded articles A. The downward movement of the plate 14 with respect to the plate 11 is restricted by stop lugs 16.

The operation of the mold, which forms no part of the present invention per se, is as follows: Charges of plastic material are placed in recesses in the mold member 8 and the mold member 8 placed on the platen 4 of the press. The press is then operated to raise the platen 4. The upper surface of the mold 8 engages the bottom of the plate 14, moving it upwardly toward the plate 11. As this upward movement continues, the plungers 13 are caused to enter the cavities in the die 8 by reason of this continued upward movement of such die, thus shaping the plastic mass in the mold cavities. This plastic mass, of course, fills the portion 15', 15a (Fig. 4) of each mold element 15, thus forming the vial or similar article. When the molding operation has been completed, the mold 8 drops down, allowing the plate 14 to drop down, causing the plungers 13 in effect to be withdrawn from the interiors of the completed articles A. The completed articles A, however, remain secured in the upper mold member by reason of the threaded engagement between the tops of the molded articles and the portion 15' of the upper mold assembly. To remove the finished articles, it is necessary to unscrew each article individually from its die. The present invention pertains to the apparatus by means of which removal of the articles can be rapidly and automatically effected.

According to my invention, there is constructed about the press a frame having four vertical corner members 18. The two corner members 18 at the side of the press are connected by cross pieces 19 and 20. This frame serves as a support and guideway for a vertically movable frame structure comprising two horizontal rods 21 and 22, the rod 21 being at the front of the press and the rod 22 being at the rear of the press. These rods 21 and 22 are hung from vertical straps 23 which straps 23 are pivotally connected at their upper ends to bell crank levers 24 secured to the top of the press. The bell crank levers are connected through toggle links 25 with an operating rod 26 extending down to a treadle 27, which treadle is pivotally supported at 28. A locking lever 29 is provided for holding the treadle down when it is desired to lock it in this position. The arrangement is such that when the treadle is pushed down a pull is exerted through the rods 26, operating the bell crank levers 24 to move the straps 23 up, lifting the cross rods 21 and 22. The weight of the structure when pressure is released from the treadle, causes the parts to return to normal position. Carried on the rod 21 is a trolley structure 30, and carried on the rod 22 is a similar trolley structure 31. The trolleys 30 and 31 are connected by a horizontal plate 33. A system of cords and pulleys connects the two trolleys so that they move in parallelism, the connecting cords being designated 34, and the guide pulleys for these cords being designated 35, the manner of arranging the cords being similar to that now used in various types of trolley arrangements where the movement of two trolleys or other devices has to be coordinated.

Figure 3:
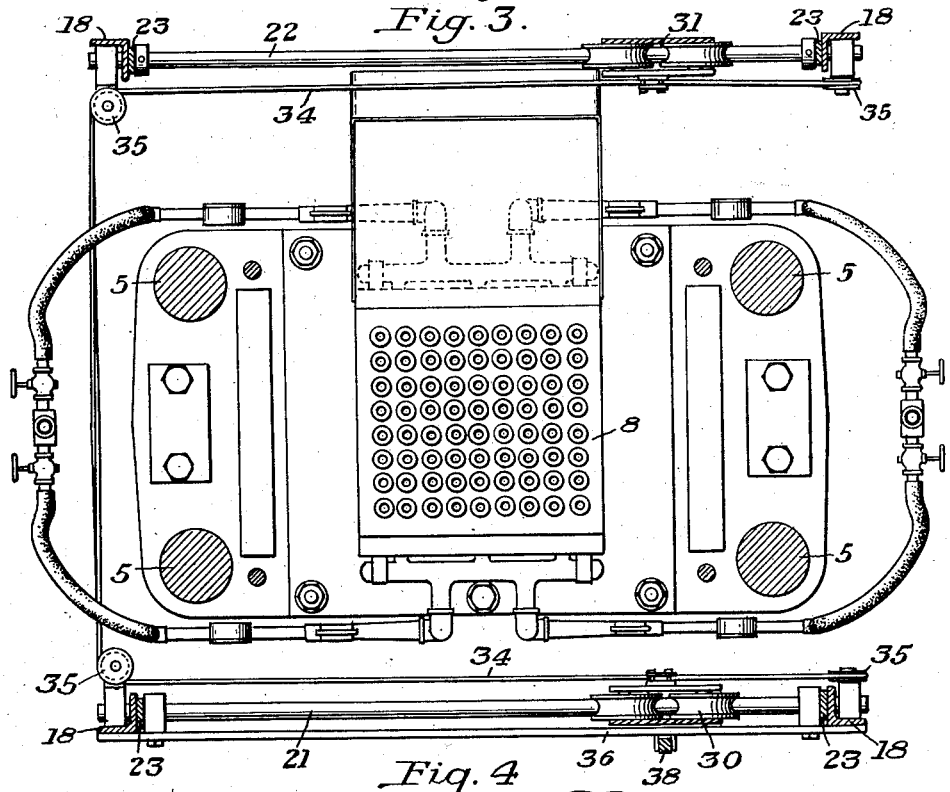
Figure 3 represents a horizontal section through the press in substantially the plane of line III—III of Figure 1.

In front of the cross rod 21 there is a cross bar 36 having a series of holes 37 therein. It will be noted by reference to the drawings that the multiple die for forming the articles A is arranged in rows extending from the front of the machine to the back, there being, as shown in Figures 1 and 3, nine rows in the particular embodiment illustrated. There are nine of the holes 37 and each hole 37 is so positioned that when a locking mechanism carried by the trolley frame comprising the two trolleys 30, 31 and the cross piece 33 is brought into position beneath a given row, it can be locked in predetermined relation to such row of forming dies. For locking the trolley frame there is provided a lever 38 on the front plate of the trolley 30, which lever is pivoted at 39. It is provided with a projection at 40 adapted when the bottom end of the locking lever is pushed in, to enter one of the holes 37. On the inside of the top of the lever 38 is a projection 41 for interlocking with a valve mechanism as hereinafter described.

On the cross piece 33 adjacent one end thereof is mounted a pulley 42. At the opposite end of the cross piece 33 is a pulley 43 having a driving shaft 44. This driving shaft may be directly coupled to a small electric motor 45. A belt 46 passes around the pulleys 42 and 43. At 47 there is illustrated an idler for engaging the belt.

The cross member 33 is longitudinally slotted between the two reaches of the belt 46 as shown at 48. Beneath the slotted area 48 of the cross member 43 is a sheet metal receiving trough 49. Along one side of the slotted portion 48 on the member 33 is a fixed series of vertical rollers 50. Mounted on the cross piece 33 along the opposite edge of the slotted portion 48 is a strip 51 having a series of vertical rollers 52 thereon, the arrangement being such that the opposite reaches of the belt 46 travel between the rollers 50 and 52 as shown in Figure 7. At each end of the supporting strip 51 for the rollers 52 is an air cylinder 53, the pistons of these cylinders being secured to the ends of the strip 51 while the cylinders themselves are fixed on the member 33. When air under pressure is applied to the cylinders 53, the strip 51 with its rollers 52, is moved toward the set of fixed rollers 50, the extent of movement being limited by the amount of slack in the belt 46.

For controlling the operation of the air cylinders 53 there is provided a flexible air supply line 55 (see Fig. 1) leading to a connector 56 on the trolley. A branch pipe 57 leading one way from this connector is provided with a valve 58 which valve controls the passage of air through pipes 59 to the two cylinders 53. For operating the valve 58 there is provided a lever 60 pivotally supported on a bracket 61 carried on the cross member 33 of the trolley assembly and which has two oppositely extending lugs 60a and 60b. The lug 60a is positioned over the valve 58 so that when the operating lever 60 is moved to the left as viewed in Figure 5, the valve stem of the valve 58 is depressed to admit air to the cylinders 53. It will be observed by reference to Figures 5 and 6 that when the locking lever 38 at the front of the trolley is in a position where the locking lug 40 is disengaged from one of the holes 37 in the strip 36, the interlocking projection 41 on this lever extends under the lug 60a of the lever 60 to prevent this lever from being moved to the left as viewed in either of these two figures. When, however, the locking lug 40 is entered in a hole 37 in the strip 36 as shown in Figure 5, the projection 41 on the upper end of the lever 38 is clear of the lug 60a and offers no impediment to the movement of the air control lever 60.

Leading in the opposite direction from the air connection 56 is a branch 62 having a valve 63 therein, best shown in Figure 7, which valve controls the flow of air into a pipe 64, which pipe opens into one end of the receiving trough 49.

The valve 63 has an operating lever 63a that terminates under the lug 60b of the lever 60, the arrangement being such that when the lever 60 is moved to the right from a vertical position as viewed in Figures 5 and 6, i. e., in a direction away from the operator on the actual installation, air is discharged through the pipe 64 into one end of the receiving trough 49.

Carried on the press is a receiver for formed articles. This receiver is designated at 65. It has a flared top 66, and one end of the receiving chute 49 extends over this flared end.

The operation of the apparatus thus described is as follows: During the process of molding, the trolley arrangement is moved over to the right hand side of the press where it occupies the position shown in Figure 1, and in which position all parts thereof are clear of the actual mold units so that the press can close without contacting the trolley or any of the parts carried thereon. When the press is opened and it is desired to remove the formed articles A the operator pushes in on the top of the lever 38 and moves the trolley to the left as viewed in Figure 1. When the locking pin 40 encounters the first hole of the series of holes 37 on the bar 36, it will snap into this hole, aligning the trolley in proper stripping relation to the first row of molded articles. The operator then steps on the treadle 27, raising the whole trolley structure in the manner previously described, by raising the two rods 21 and 22, the trolley being raised until the molded articles A of the first row on the die project down between the two reaches of the belt 46. The vertical rollers 50 and 52 on the trolley frame are so positioned with respect to the mold that the molded articles A are staggered with reference to the rollers 50 and 52, as clearly shown in Figure 8. When the parts are in this position, the operator pulls the air control lever 60 towards him, opening the valve 58 to operate the two air cylinders 53. This operation of the air cylinders causes the vertical rollers 52 to move toward the rollers 50, causing the two reaches of the stripping belt 46 to frequently bear against each of the molded articles A in the first row of articles, as is clearly shown in Figure 8. During this adjustment of the trolley and the bringing of the parts into position, the motor 45 will be operating to drive the belt so that as soon as the belt frictionally engages the articles A they will be rotated by engagement with the traveling belt and unscrewed. As soon as they are unscrewed, the operator pushes the lever 60 away from him, i. e., to the right as viewed in Figure 5, causing the two reaches of the belt to separate. The formed articles A drop through the slotted area 48 of the member 33 into the trough 49. A blast of air delivered through the pipe 64 serves to blow the articles out of the receiving trough, allowing them to drop into the receiver 65. When this row of articles has been stripped, the operator releases the air control lever 60, releasing the treadle 27, allowing the trolley to drop a point where it clears the molded articles projecting from the bottom of the die.

The operator then releases the trolley locking lever 38, moves the trolley over a single notch, steps on the treadle 27, and repeats the operation. In this manner, all nine rows of molded articles are very rapidly stripped from the mold and discharged into the receptacle, it requiring but an instant to effect the complete operation for each row. When the operator has finished stripping the articles from the mold he returns the trolley to the original position at the right of the press, and is ready to repeat the molding operation.

The invention provides a mold stripping apparatus wherein the articles may be unscrewed from the mold in which they are formed and by which the articles are frictionally engaged by a moving stripping element which serves to rotate them in the proper direction. The invention further provides a stripping mechanism in which a plurality of molded elements can be stripped from the mold at a single operation. The invention also provides an arrangement whereby rows of articles can be progressively engaged and unscrewed from the mold, and provision is made for properly positioning the stripping mechanism with reference to the molded articles before operation of the stripping mechanism, so as to prevent damage to the articles. The invention is particularly applicable to the molding of long tube-like articles, such as the vial illustrated in Figure 4, which can be stripped from the dies by the stripping mechanisms heretofore provided for stripping other molded articles from the molds. For instance, the stripping mechanism used for removing bottle caps from the molds in which they are formed, as now constructed, cannot be conveniently used for removing vials. With properly constructed molds, however, the present stripping mechanism can be used for stripping articles other than vials, including bottle caps.

While I have illustrated and described one specific embodiment of my invention, it will be understood that this is by way of illustration, and that various modifications and changes may be made within the contemplation of the invention and under the scope of the following claims.

I claim:

1. The combination with a press having a multiple mold, of a stripping mechanism movable with respect to said mold horizontally and vertically into and out of position to engage articles formed on the mold. said stripper comprising a belt means having oppositely traveling reaches to engage articles therebetween, and means for moving one reach toward and away from the other in a direction at right angles to the plane of the belt.

2. Apparatus of the class described comprising a series of molds, a support movable with respect to the molds, an endless belt carried thereon, means for driving the belt, said support being movable to a position where the molds are between two reaches of the belt and means for moving one reach of the belt toward and away from the other in a transverse direction to engage articles on the molds.

3. Apparatus of the class described comprising a series of molds, a movable support, an endless belt carried on the support, means for driving the belt, said support being movable to a position where the molds are between the reaches of the belt, means for moving one reach of the belt toward and away from the other in a transverse direction to engage articles on the mold, and means at the back of the other reach of the belt for resisting lateral pressure against it.

4. Molding apparatus comprising a multiple mold unit, a stripping device comprising a supporting frame movable into and out of position to engage articles on a plurality of the molds of said unit at one time, having substantially parallel belt means thereon for frictionally engaging and rotating articles positioned between them, and means for moving one of said belt means transversely toward and away from the other.

5. The combination with a press having a multiple mold for the formation of plastic articles, of a stripper having a belt for engaging and rotating articles formed on the molds, said stripper being supported for movement back and forth across the press into and out of operative position with respect to the mold, means for raising and lowering the stripper into and out of position to engage articles formed in the mold, and means for releasably locking the stripper in predetermined operating positions with respect to the mold.

6. The combination with a press having a multiple mold for the formation of plastic artcicles, of a stripper having a belt for engaging and rotating articles formed on the molds, said stripper being supported for movement back and forth across the press into and out of operative position with respect to the mold, means for raising and lowering the stripper into and out of position to engage articles formed in the mold, means for releasably locking the stripper in predetermined operating positions with respect to the mold, and operating means for controlling the stripper, said operating means and said locking means having inter-engaging parts to prevent the operating means from being manipulated when said locking means is released.

7. Molding apparatus comprising a press with a multiple mold on which articles threaded to the mold are formed, stripping mechanism comprising a supporting frame, said frame being movable into and out of the press and movable vertically with respect to the multiple mold, a belt mounted on the frame, a guide member for supporting one reach of the belt, and means for moving the guide means transversely of the belt.

8. Molding apparatus comprising a press with a series of mold units, a stripping mechanism arranged for unscrewing articles from the mold units, said stripping mechanism comprising a supporting frame, a belt mounted on the frame, a guide member for suppotring one reach of the belt, and means for moving the guide means transversely of the belt into and out of engagement with articles on the mold units, said means comprising air cylinders.

9. A stripping mechanism of the class described comprising a supporting frame, a guideway in which the frame is movably supported, a belt mounted on the frame, a guide member for supporting one reach of the belt, and means for moving the guide means transversely of the belt, the other reach of the belt being opposite said first reach, and supporting means for said other reach of the belt, the two reaches of the belt being so arranged as to receive articles therebetween, transverse movement of one reach with respect to the other serving to bring the two reaches of the belt into frictional engagement with an article so disposed between them.

10. A mechanism for simultaneously removing a number of formed articles from plungers with which the articles have a screw-threaded engagement, comprising an unscrewing means having opposed oppositely movable article-engaging surfaces, means for driving said unscrewing means, means for shifting one of the article-engaging surfaces of said unscrewing means toward and away from the other; whereby the article on the plunger positioned between the said surfaces may be tightly confined between said surfaces and rotated when the said surfaces move in opposite directions, a supporting structure on which the unscrewing means is mounted, and means for moving the supporting structure in a direction axially of the plungers.

11. In a molding machine of the character described, the combination of upper and lower molds separable to provide a space therebetween, an unscrewing unit, track plates carrying said unscrewing unit for sliding movement longitudinally relative thereto, toggle means supporting the track plates for raising and lowering the same, and means for moving the unscrewing unit on the track plates into the space between the upper and lower molds when separated for removal of products from the molds.

12. In a molding machine of the character described, the combination of upper and lower molds separable to provide a space therebetween, an unscrewing unit, track plates carrying said unscrewing unit for sliding movement longitudinally relative thereto, toggle means supporting the track plates for raising and lowering the same, means for moving the unscrewing unit on the track plates into the space between the upper and lower molds when separated for removal of the products from the molds, and means for operating the toggle means to move said unscrewing unit into engagement with the products to remove the same from between the molds.

13. Apparatus for molding articles, comprising a press having mold means thereon shaped to form a plurality of articles having screw-threaded engagement with the mold means, a stripper movable into and out of position to engage and rotate the articles to unscrew them from the mold means, a trackway on the press on which the stripper is supported and along which it is movable, said stripper comprising a belt movable in a direction to rotate the formed articles about their axes on the mold means to unscrew them, said stripper being movable along the trackway from a position between the molds to a position at one side of the molds, and means whereby the elevation of the stripper with reference to the press may be changed.

14. In a molding machine of the character described, the combination of a plurality of separable molds arranged in a plurality of parallel rows for molding a plurality of separate products therebetween with a screw-threaded connection between each product and a mold, movable means constructed to engage a single row only of the products at a time normally positioned to one side of the separable molds and adapted to be progressively moved to successive rows of said products, and means for progressively moving said last-named means across the space between said molds after separation thereof for engaging successive rows of the products to remove the same.

CHARLES C. WEBB.